US012707069B2

(12) United States Patent
Yang

(10) Patent No.: US 12,707,069 B2
(45) Date of Patent: Aug. 11, 2026

(54) CONFIGURATION OF A MINIMUM FREQUENCY METRIC FOR DECODING A BITSTREAM

(71) Applicant: QUALCOMM Incorporated, San Diego, CA (US)

(72) Inventor: Shengqi Yang, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/976,274

(22) Filed: Dec. 10, 2024

(65) Prior Publication Data

US 2026/0164042 A1 Jun. 11, 2026

(51) Int. Cl.
*H04N 19/184* (2014.01)
*H04N 19/156* (2014.01)

(52) U.S. Cl.
CPC ......... *H04N 19/184* (2014.11); *H04N 19/156* (2014.11)

(58) Field of Classification Search
CPC .................................................... H04N 19/184
See application file for complete search history.

(56) References Cited

U.S. PATENT DOCUMENTS

2024/0056585 A1 * 2/2024 Wang ..................... H04N 19/13

OTHER PUBLICATIONS

Cabarat P-L., et al., "Pictures Decoding Time Estimation for Low-Power VVC Software Decoding", 2024 32nd European Signal Processing Conference Eusipco) European Association for Signal Processing—EURASIP, Aug. 26, 2024, pp. 947-951, XP034730678, The Whole Document.

Faramarzi (Samsung Electronics) E., et al., "Display Adaptation and Codec DVFS for Green MPEG", International Organisation for Standardisation Organisation Internationale De Normalisation ISO/IEC JTC1/SC29/ WG11 MPEG2013/m31588, Coding of Moving Pictures and Audio, 106. MPEG Meeting; Oct. 28, 2013-Jan. 11, 2013; Geneva; (Motion Picture Expert Group or ISO/IEC JTC1/SC29/WG11), Oct. 27, 2013, XP030060040, 8 Pages, The Whole Document.

International Search Report and Written Opinion—PCT/US2025/056132—ISA/EPO—Mar. 25, 2026.

"WD of ISO/IEC 23001-11 2nd Edition Energy-Efficient Media Consumption (Green Metadata)", 135. MPEG Meeting; Jul. 12, 2021-Jul. 16, 2021; Online; (Motion Picture Expert Group or ISO/IEC JTC1/SC29/WG11), Aug. 10, 2021, pp. 1-90, XP030296362, The Whole Document.

* cited by examiner

*Primary Examiner* — Jerry T Jean Baptiste
(74) *Attorney, Agent, or Firm* — Procopio, Cory, Hargreaves & Savitch LLP

(57) ABSTRACT

This disclosure provides systems, devices, apparatus, and methods, including computer programs encoded on storage media, for configuring minimum frequency metrics of decoding sessions. A display processor may obtain an indicator of a bitrate and an indicator of a binrate for a decoding session. The display processor may determine a minimum frequency metric based on the obtained indicator of the bitrate. The display processor may configure the determined minimum frequency metric based on the obtained indicator of the binrate. The display processor may output an indicator of the configured minimum frequency metric. The display processor may select an operational power level based on the configured minimum frequency metric. The display processor may output an indicator of the selected operational power level to a video hardware decoder.

20 Claims, 6 Drawing Sheets

CONFIGURATION OF A MINIMUM FREQUENCY METRIC FOR DECODING A BITSTREAM

TECHNICAL FIELD

The present disclosure relates generally to processing systems, and more particularly, to one or more techniques for display processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor may be configured to convert digital information received from a CPU to analog values and may issue commands to a display panel for displaying the visual content. A device that provides content for visual presentation on a display may utilize a CPU, a GPU, and/or a display processor.

Current techniques may not address variations mis-predicted motion vectors when decoding frames of a bitstream. There is a need for improved motion vector prediction techniques when configuring operation power levels used for decoding sessions.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus includes a memory; and a processor coupled to the memory and, based on information stored in the memory, the processor may be configured to obtain an indicator of a bitrate and an indicator of a binrate for a decoding session. The processor may be configured to determine a minimum frequency metric based on the obtained indicator of the bitrate. The processor may be configured to configure the determined minimum frequency metric based on the obtained indicator of the binrate. The processor may be configured to output an indicator of the configured minimum frequency metric. For example, the processor may be configured to select an operational power level based on the configured minimum frequency metric and output an indicator of the selected operational power level to a video hardware decoder.

In some aspects, the techniques described herein relate to a method of video processing, including: obtaining an indicator of a bitrate and an indicator of a binrate for a decoding session; determining a minimum frequency metric based on the obtained indicator of the bitrate; configuring the determined minimum frequency metric based on the obtained indicator of the binrate; and outputting an indicator of the configured minimum frequency metric.

In some aspects, the techniques described herein relate to a method, where obtaining the indicator of the binrate for the decoding session includes: obtaining a second indicator of the binrate for the decoding session from a video hardware decoder decoding a bitstream for the decoding session.

In some aspects, the techniques described herein relate to a method, where obtaining the indicator of the binrate for the decoding session includes: decoding a portion of a bitstream for the decoding session; and tracking the binrate while decoding the portion of the bitstream for the decoding session.

In some aspects, the techniques described herein relate to a method, where outputting the indicator of the configured minimum frequency metric includes: selecting an operational power level based on the configured minimum frequency metric; and outputting an indicator of the selected operational power level to a video hardware decoder.

In some aspects, the techniques described herein relate to a method, further including: operating the video hardware decoder at the operational power level during the decoding session; and decoding, via the video hardware decoder, a bitstream for the decoding session.

In some aspects, the techniques described herein relate to a method, where outputting the indicator of the selected operational power level to the video hardware decoder includes: outputting the indicator of the selected operational power level to a firmware of the video hardware decoder.

In some aspects, the techniques described herein relate to a method, further including: selecting a second operational power level based on the determined minimum frequency metric based on the obtained indicator of the bitrate before the configuration of the determined minimum frequency metric based on the obtained indicator of the binrate; and outputting a second indicator of the selected second operational power level to the video hardware decoder before outputting the indicator of the selected operational power level to the video hardware decoder.

In some aspects, the techniques described herein relate to a method, where configuring the determined minimum frequency metric based on the obtained indicator of the binrate includes: adjusting the determined minimum frequency metric by a ratio based on the obtained indicator of the binrate.

In some aspects, the techniques described herein relate to a method, where configuring the determined minimum frequency metric based on the obtained indicator of the binrate includes: adjusting a numerator of the ratio in response to the binrate being greater than a previous binrate of the decoding session; adjusting a denominator of the ratio in response to the binrate being less than the previous binrate of the decoding session; or refraining from adjusting the ratio in response to the binrate being equal to the previous binrate of the decoding session.

In some aspects, the techniques described herein relate to a method, where configuring the determined minimum frequency metric based on the obtained indicator of the binrate includes: refraining from adjusting the determined minimum frequency metric by a ratio based on the obtained indicator of the binrate.

In some aspects, the techniques described herein relate to a method, where configuring the determined minimum frequency metric based on the obtained indicator of the binrate includes: refraining from adjusting the determined minimum frequency metric by a ratio in response to the binrate being equal to a previous binrate of the decoding session.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
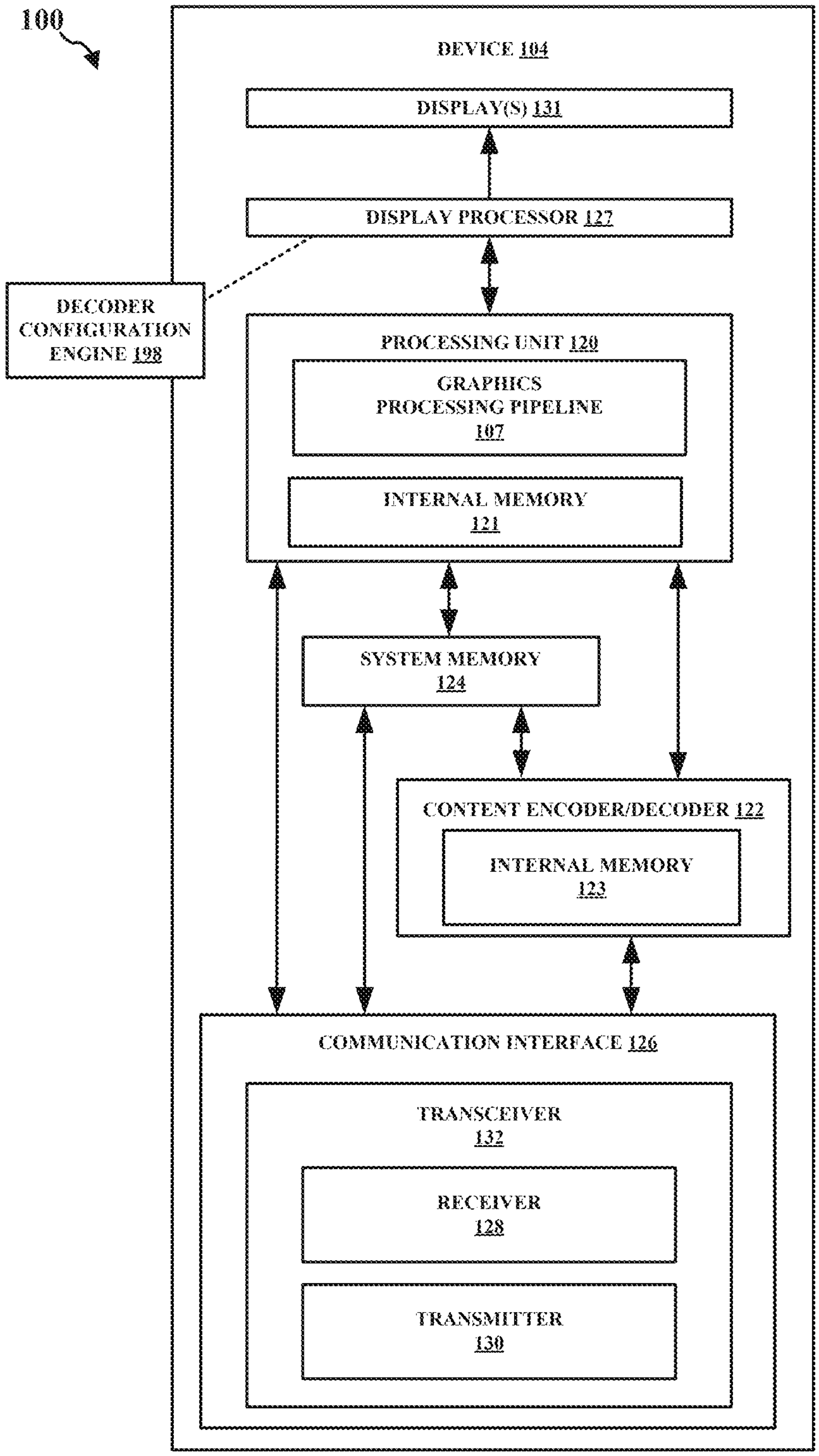
FIG. 1 is a block diagram that illustrates an example content generation system, in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, processing systems, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

In one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to "graphical content," an "image," etc., regardless of whether the terms are used as an adjective, noun, or other parts of speech. In some examples, the term "graphical content," as used herein, may refer to a content produced by one or more processes of a graphics processing pipeline. In further examples, the term "graphical content," as used herein, may refer to a content produced by a processing unit configured to perform graphics processing. In still further examples, as used herein, the term "graphical content" may refer to a content produced by a graphics processing unit.

In some aspects, a display processing system may use a video static performance model to project, or estimate, the speed of a VSP engine and/or a video pixel processing (VPP) engine. A VSP engine may also be referred to as a VSP. A VPP engine may also be referred to as a VPP. The display processing system may use the projected speed (e.g., in cycles per second) to adjust an operational power level of video hardware to meet minimum decoding standards. By adjusting the operational power level of video hardware to meet minimum decoding standards, the display processing system may save power and/or optimize performance without causing undue frame drops when the projection is accurate. However, in some aspects, the projection may not be accurate or may fail completely, causing frame drops. For example, a VSP may use many more cycles per second than what is estimated to decode a bitstream. Such projections may occur when a video static performance model uses bitrate information and no other information to estimate the speed of processing a bitstream. In some aspects, a hardware decoder may be configured to accumulate, or track, the number of binary symbols (BINs) processed per second for a decoding session. The hardware decoder may feed this number back to video firmware through software interrupt (SWI) registers. The firmware may send the number of BINs, along with the bitrate information, through a hardware feedback interface (HFI). A video driver may plug the binrate information and bitrate information into a video static performance model to project processing speed for VSP and/or VPP more accurately, which may be used to select operational power levels for the video hardware In some examples, a display processor (or display processor system) may obtain an indicator of a bitrate and an indicator of a binrate for a decoding session. A bitrate for a decoding session may be characterized as the number of bits that are processed by a display processor system per second. For example, an ultra-high definition bitstream having 60 frames per second (fps) may be 62 megabits per second (Mbps). A binrate for a decoding session may be characterized as the number of binary symbols, or bins, processed by a display processor system per second. A display processing system may have a video syntax processing (VSP) engine configured to encode binary symbols into bits and vice-versa. For example, a VSP engine may use a context-adaptive binary arithmetic coding (CABAC) engine to decode bits into binary symbols during a decoding session. The display processor may determine a minimum frequency metric based on the obtained indicator of the bitrate. The minimum frequency metric may be a number of cycles the display processor may use, at minimum, to decode the bitstream of the decoding session per second. For example, the display processor may use a video static model, or a video static performance model, to estimate that a VSP may use 150 million cycles per second to decode a 62 Mbps bitstream. The display processor may configure the determined minimum frequency metric based on the obtained indicator of the binrate. For example, the display processor may select a ratio based on the binrate and may then multiply the determined minimum frequency metric by the selected ratio. The display processor may output an indicator of the configured minimum frequency metric. For example, the display processor may select an operational power level for a video hardware decoder based on the configured minimum frequency metric and may output the selected operational power level to the video hardware decoder to use during a portion of the decoding session.

Particular aspects of the subject matter described in this disclosure can be implemented to realize one or more of the following potential advantages. In some examples, by using a binrate of a decoding session to accurately configure the minimum frequency metric of the decoding session, the described techniques can be used to optimize the operational power level of video hardware during decoding without sacrificing performance (e.g., dropping frames).

The examples herein may describe any video hardware decoder system that may be used to encode or decode a bitstream. The video hardware decoder system may include video hardware that encodes or decodes the bitstream, video firmware that serves as an HFI to the video hardware, and video software, such as a device driver, which may be used to accurately estimate a minimum frequency metric of a decoding session to optimize the operational power levels used by the video hardware. The examples describe herein may refer to a use and functionality of a graphics processing unit (GPU). As used herein, a GPU can be any type of graphics processor, and a graphics processor can be any type of processor that is designed or configured to process graphics content. For example, a graphics processor or GPU can be a specialized electronic circuit that is designed for processing graphics content. As an additional example, a graphics processor or GPU can be a general purpose processor that is configured to process graphics content.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of a SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. The first display may be a left-eye display and the second display may be a right-eye display. In some examples, the first display and the second display may receive different frames for presentment thereon. In other examples, the first and second display may receive the same frames for presentment thereon. In further examples, the results of the graphics processing may not be displayed on the device, e.g., the first display and the second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. The content encoder/decoder 122 may include an internal memory 123. In some examples, the device 104 may include a processor, which may be configured to perform one or more display processing techniques on one or more frames generated by the processing unit 120 before the frames are displayed by the one or more displays 131. While the processor in the example content generation system 100 is configured as a display processor 127, it should be understood that the display processor 127 is one example of the processor and that other types of processors, controllers, etc., may be used as substitute for the display processor 127. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 may be communicatively coupled to the system memory 124 over a bus. In some examples, the processing unit 120 and the content encoder/decoder 122 may be communicatively coupled to the internal memory 121 over the bus or via a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory. The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, a GPGPU, or any other processing unit that may be configured to perform graphics processing. In some examples, the processing unit 120 may be integrated into a motherboard of the device 104. In further examples, the processing unit 120 may be present on a graphics card that is installed in a port of the motherboard of the device 104, or may be otherwise incorporated within a peripheral device configured to interoperate with the device 104. The processing unit 120 may include one or more processors, such as one or more microprocessors, GPUs, ASICs, FPGAs, arithmetic logic units (ALUs), DSPs, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, and/or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the display processor 127 may include a decoder configuration engine 198 configured to obtain an indicator of a bitrate and an indicator of a binrate for a decoding session. The decoder configuration engine 198 may be configured to determine a minimum frequency metric based on the obtained indicator of the bitrate. The decoder configuration engine 198 may be configured to configure the determined minimum frequency metric based on the obtained indicator of the binrate. The decoder configuration engine 198 may be configured to output an indicator of the configured minimum frequency metric. Although the following description may be focused on display processing, the concepts described herein may be applicable to other similar processing techniques.

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in other embodiments, may be performed using other components (e.g., a CPU) consistent with the disclosed embodiments.

GPUs can render images in a variety of different ways. In some instances, GPUs can render an image using direct rendering and/or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects of tiled rendering, during a binning pass, an image can be divided into different bins or tiles. In some aspects, during the binning pass, a visibility stream can be constructed where visible primitives or draw calls can be identified. A rendering pass may be performed after the binning pass. In contrast to tiled rendering, direct rendering does not divide the frame into smaller bins or tiles. Rather, in direct rendering, the entire frame is rendered at a single time (i.e., without a binning pass). Additionally, some types of GPUs can allow for both tiled rendering and direct rendering (e.g., flex rendering).

In some aspects, GPUs can apply the drawing or rendering process to different bins or tiles. For instance, a GPU can render to one bin, and perform all the draws for the primitives or pixels in the bin. During the process of rendering to a bin, the render targets can be located in GPU internal memory (GMEM). In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible so that the non-visible primitives are not rendered, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a binning, a visibility or bin-visibility pass and a rendering or bin-rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitive in each bin or area, e.g., in a system memory. This visibility information can be used to determine or generate a visibility stream. In a rendering pass, the primitives in each bin can be rendered separately. In these instances, the visibility stream can be fetched from memory and used to remove primitives which are not visible for that bin.

Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

Figure 2:
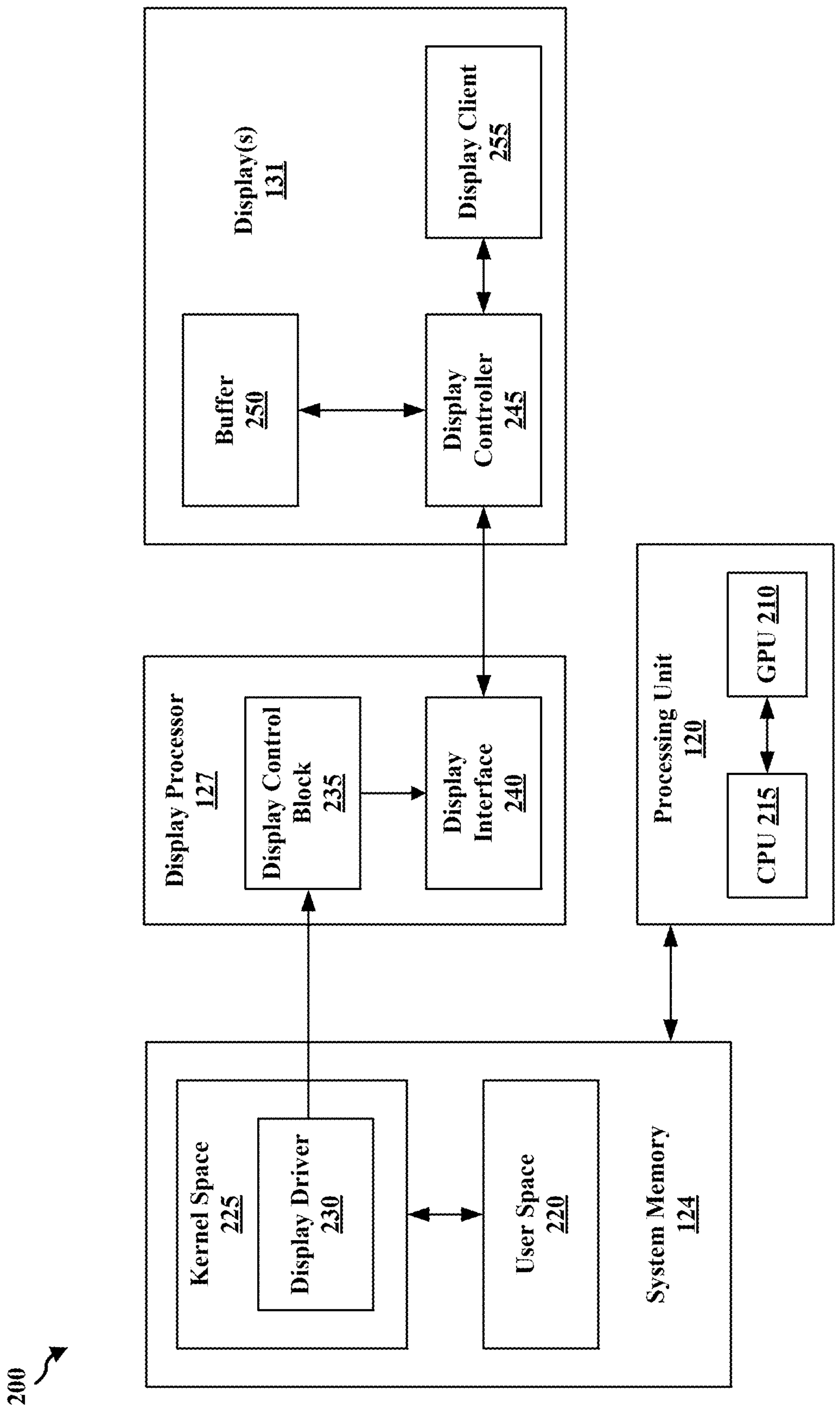
FIG. 2 illustrates an example display framework including a display processor and a display, in accordance with one or more techniques of this disclosure.

FIG. 2 is a block diagram 200 that illustrates an example display framework including the processing unit 120, the system memory 124, the display processor 127, and the display(s) 131, as may be identified in connection with the device 104.

A GPU may be included in devices that provide content for visual presentation on a display. For example, the processing unit 120 may include a GPU 210 configured to render graphical data for display on a computing device (e.g., the device 104), which may be a computer workstation, a mobile phone, a smartphone or other smart device, an embedded system, a personal computer, a tablet computer, a video game console, and the like. Operations of the GPU 210 may be controlled based on one or more graphics processing commands provided by a CPU 215. The CPU 215 may be configured to execute multiple applications concurrently. In some cases, each of the concurrently executed multiple applications may utilize the GPU 210 simultaneously. Processing techniques may be performed via the processing unit 120 output a frame over physical or wireless communication channels.

The system memory 124, which may be executed by the processing unit 120, may include a user space 220 and a kernel space 225. The user space 220 (sometimes referred to as an "application space") may include software application(s) and/or application framework(s). For example, software application(s) may include operating systems, media applications, graphical applications, workspace applications, etc. Application framework(s) may include frameworks used by one or more software applications, such as libraries, services (e.g., display services, input services, etc.), application program interfaces (APIs), etc. The kernel space 225 may further include a display driver 230. The display driver 230 may be configured to control the display processor 127. For example, the display driver 230 may cause the display processor 127 to compose a frame and transmit the data for the frame to a display.

The display processor 127 includes a display control block 235 and a display interface 240. The display processor 127 may be configured to manipulate functions of the display(s) 131 (e.g., based on an input received from the display driver 230). The display control block 235 may be further configured to output image frames to the display(s) 131 via the display interface 240. In some examples, the display control block 235 may additionally or alternatively perform post-processing of image data provided based on execution of the system memory 124 by the processing unit 120.

The display interface 240 may be configured to cause the display(s) 131 to display image frames. The display interface 240 may output image data to the display(s) 131 according to an interface protocol, such as, for example, the MIPI DSI (Mobile Industry Processor Interface, Display Serial Interface). That is, the display(s) 131, may be configured in accordance with MIPI DSI standards. The MIPI DSI standard supports a video mode and a command mode. In examples where the display(s) 131 is/are operating in video mode, the display processor 127 may continuously refresh the graphical content of the display(s) 131. For example, the entire graphical content may be refreshed per refresh cycle (e.g., line-by-line). In examples where the display(s) 131 is/are operating in command mode, the display processor 127 may write the graphical content of a frame to a buffer 250.

In some such examples, the display processor 127 may not continuously refresh the graphical content of the display(s) 131. Instead, the display processor 127 may use a vertical synchronization (Vsync) pulse to coordinate rendering and consuming of graphical content at the buffer 250. For example, when a Vsync pulse is generated, the display processor 127 may output new graphical content to the buffer 250. Thus, generation of the Vsync pulse may indicate that current graphical content has been rendered at the buffer 250.

Frames are displayed at the display(s) 131 based on a display controller 245, a display client 255, and the buffer 250. The display controller 245 may receive image data from the display interface 240 and store the received image data in the buffer 250. In some examples, the display controller 245 may output the image data stored in the buffer 250 to the display client 255. Thus, the buffer 250 may represent a local memory to the display(s) 131. In some examples, the display controller 245 may output the image data received from the display interface 240 directly to the display client 255.

The display client 255 may be associated with a touch panel that senses interactions between a user and the display(s) 131. As the user interacts with the display(s) 131, one or more sensors in the touch panel may output signals to the display controller 245 that indicate which of the one or more sensors have sensor activity, a duration of the sensor activity, an applied pressure to the one or more sensor, etc. The display controller 245 may use the sensor outputs to determine a manner in which the user has interacted with the display(s) 131. The display(s) 131 may be further associated with/include other devices, such as a camera, a microphone, and/or a speaker, that operate in connection with the display client 255.

Some processing techniques of the device 104 may be performed over three stages (e.g., stage 1: a rendering stage; stage 2: a composition stage; and stage 2: a display/transfer stage). However, other processing techniques may combine the composition stage and the display/transfer stage into a single stage, such that the processing technique may be executed based on two total stages (e.g., stage 1: the rendering stage; and stage 2: the composition/display/transfer stage). During the rendering stage, the GPU 210 may process a content buffer based on execution of an application that generates content on a pixel-by-pixel basis. During the composition and display stage(s), pixel elements may be assembled to form a frame that is transferred to a physical display panel/subsystem (e.g., the displays 131) that displays the frame.

Instructions executed by a CPU (e.g., software instructions) or a display processor may cause the CPU or the display processor to search for and/or generate a composition strategy for composing a frame based on a dynamic priority and runtime statistics associated with one or more composition strategy groups. A frame to be displayed by a physical display device, such as a display panel, may include a plurality of layers. Also, composition of the frame may be based on combining the plurality of layers into the frame (e.g., based on a frame buffer). After the plurality of layers are combined into the frame, the frame may be provided to the display panel for display thereon. The process of combining each of the plurality of layers into the frame may be referred to as composition, frame composition, a composition procedure, a composition process, or the like.

A frame composition procedure or composition strategy may correspond to a technique for composing different layers of the plurality of layers into a single frame. The plurality of layers may be stored in doubled data rate (DDR) memory. Each layer of the plurality of layers may further correspond to a separate buffer. A composer or hardware composer (HWC) associated with a block or function may determine an input of each layer/buffer and perform the frame composition procedure to generate an output indicative of a composed frame. That is, the input may be the layers and the output may be a frame composition procedure for composing the frame to be displayed on the display panel.

Some aspects of display processing may utilize different types of mask layers, e.g., a shape mask layer. A mask layer is a layer that may represent a portion of a display or display panel. For instance, an area of a mask layer may correspond to an area of a display, but the entire mask layer may depict a portion of the content that is actually displayed at the display or panel. For example, a mask layer may include a top portion and a bottom portion of a display area, but the middle portion of the mask layer may be empty. In some examples, there may be multiple mask layers to represent different portions of a display area. Also, for certain portions of a display area, the content of different mask layers may overlap with one another. Accordingly, a mask layer may represent a portion of a display area that may or may not overlap with other mask layers.

Figure 3:
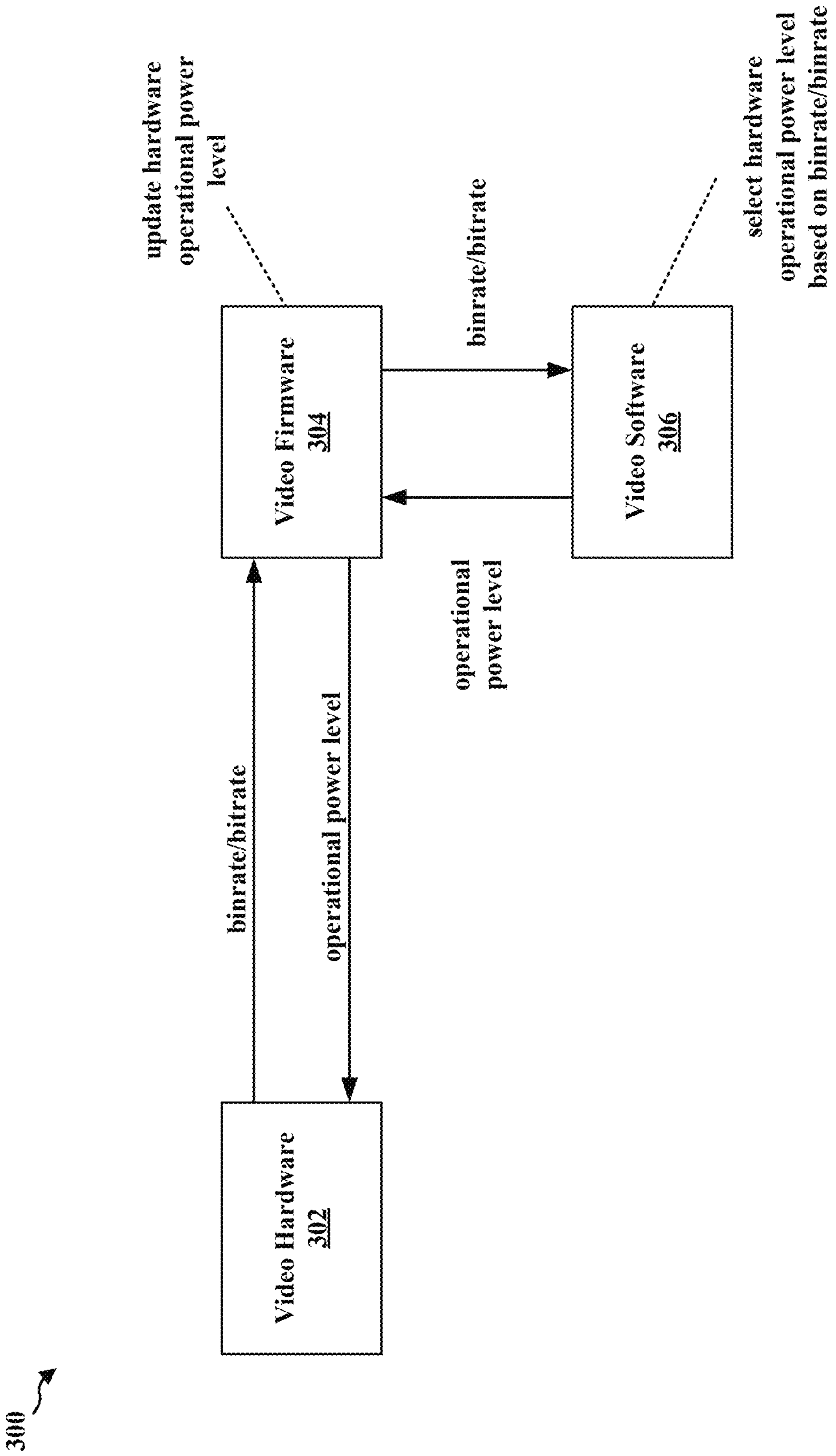
FIG. 3 illustrates an example display framework including video software configured to select an operational power level for video hardware, in accordance with one or more techniques of this disclosure.

FIG. 3 is a diagram 300 of an exemplary display framework including video software 306 configured to select an operational power level for video hardware 302. The video software 306 may include, for example, a device driver for a display processing system. The video firmware 304 may act as an HFI for the video hardware 302. The video hardware 302 may be a video decoder having a VSP and a VPP to process a bitstream. The video hardware 302 may include a video processor. The VSP may have a CABAC engine configured to encode a set of binary symbols into bits of a bitstream, and/or decode a set of bits of a bitstream into a set of binary symbols for display. The VPP may be configured to transform, predict, and/or filter pixels for encoding a frame into a set of binary symbols, or to process a set of binary symbols for projecting on a display.

The video hardware 302 may be configured to encode/decode a bitstream. During encoding/decoding, the video hardware may transmit an indicator of a bitrate, and/or transmit an indicator of a binrate, to the video firmware 304, allowing the video software 306 to track the bitrate and/or the binrate of the video hardware 302 during an encoding session or a decoding session. During a decoding session, the video hardware 302 may accumulate the number of BINs for each frame and may feed the number to the video firmware 304 via a set of SWI registers. The video firmware 304 may transmit an indicator of the bitrate and/or an indicator of the binrate received from the video hardware 302 to the video software 306 via an HFI. The video firmware 304 may read the bitstream length during parsing.

The video software 306 may use a video static model to project the number of cycles used by the VSP and/or the VPP of the video hardware 302 during an encoding or a decoding session. The video static model may be configured to project the number of cycles based on the bitrate, based on the binrate, or based on both the binrate and the bitrate. The number of cycles may be used to select an operational power level for the video hardware.

TABLE 1

| Operational Power Levels vs. Cycles Per Second | |
|---|---|
| Operational power level | Million Cycles Per Second |
| 1 | 100M |
| 2 | 200M |
| 3 | 300M |
| 4 | 400M |
| 5 | 500M |
| 6 | 600M |
| 7 | 700M |

Table 1 shows a correlation between operational power levels and cycles per second for a set of video hardware. In one example, video software may project that a VSP can decode a 120 Mbps bitstream in 500 million (M) cycles and may select an operational power level for the video hardware of 6 to ensure that the VSP can handle at least 500M cycles. In another example, video software may project that a VSP can decode a 62 Mbps bitstream in 259M cycles and may select an operational power level for the video hardware of 3 to ensure that the VSP can handle at least 259M cycles. In other words, the video software may select an operational power level correlated with a number of cycles per second that is greater than the projected speed.

While video static models may sometimes accurately project a speed of video hardware based on a bitrate of a bitstream and no other information, such video static models may not always accurately project the speed of the video hardware absent information about the binrate of processing the bitstream.

Figure 4:
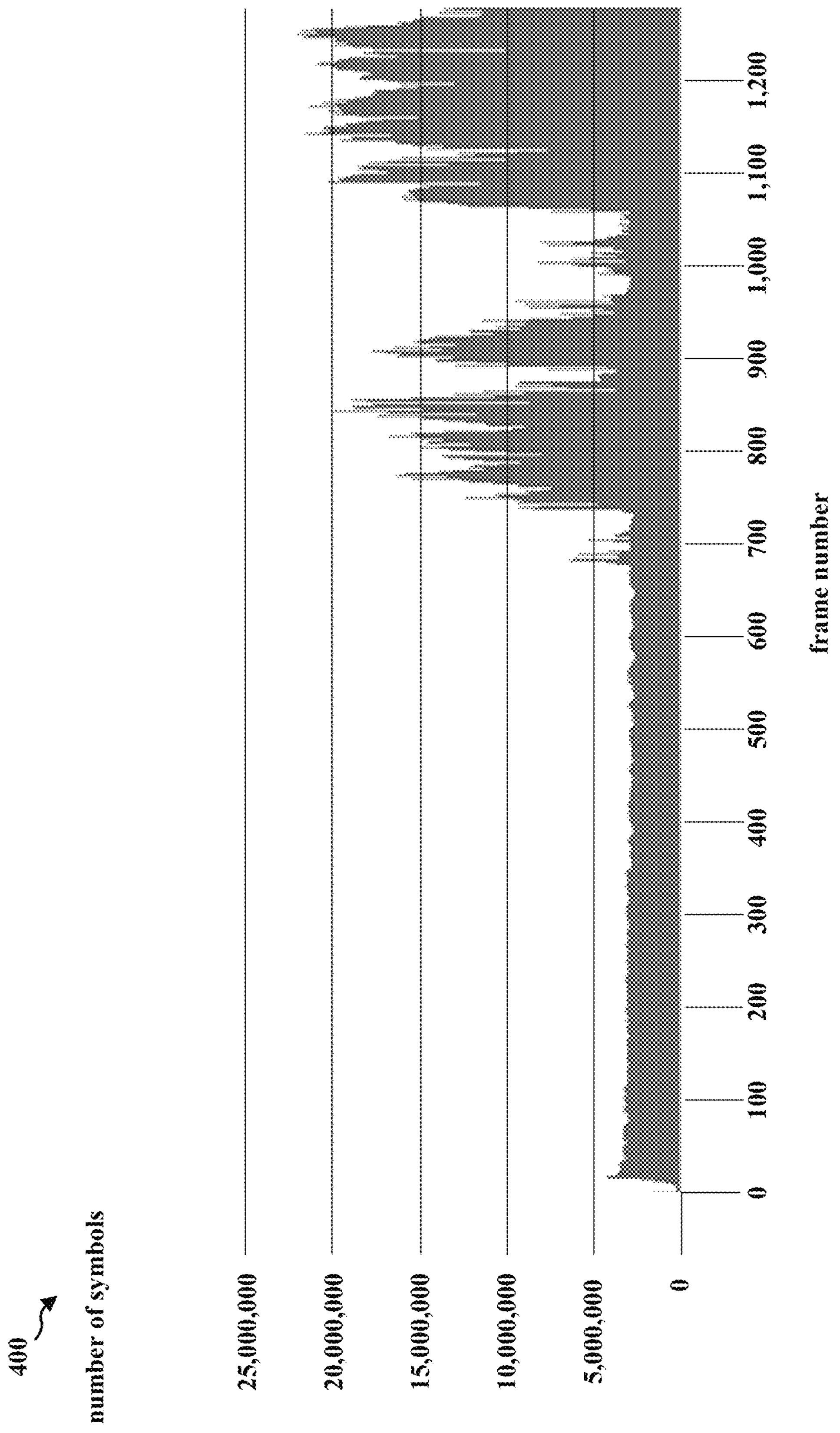
FIG. 4 illustrates an example of a non-linear correlation between the number of symbols used to decode a bitstream, in accordance with one or more techniques of this disclosure.

FIG. 4 is a diagram 400 illustrating a non-linear correlation between a bitrate and a binrate. As shown, a VSP may decode a bitstream having over 1300 frames. Up until around the $600^{th}$ frame, the VSP may decode about 5M symbols per frame. However, starting from about the $680^{th}$ frame, compared with previous frames, the frames may have larger light changes, which may make motion estimation more complex for an encoder or a decoder. A video static model that uses a bitrate of a bitstream, without taking into consideration the binrate of the bitstream, may mis-predict the motion vectors for the frames after the $680^{th}$ frame, as the video hardware may uses more symbols per frame to encode/decode the later frames. While the number of bits per frame may be the same from the $1^{st}$ frame to the last frame indicated by diagram 400, the number of bins, or symbols, used per frame may differ by 2 times, 3 times, or even 4 times.

Figure 5:
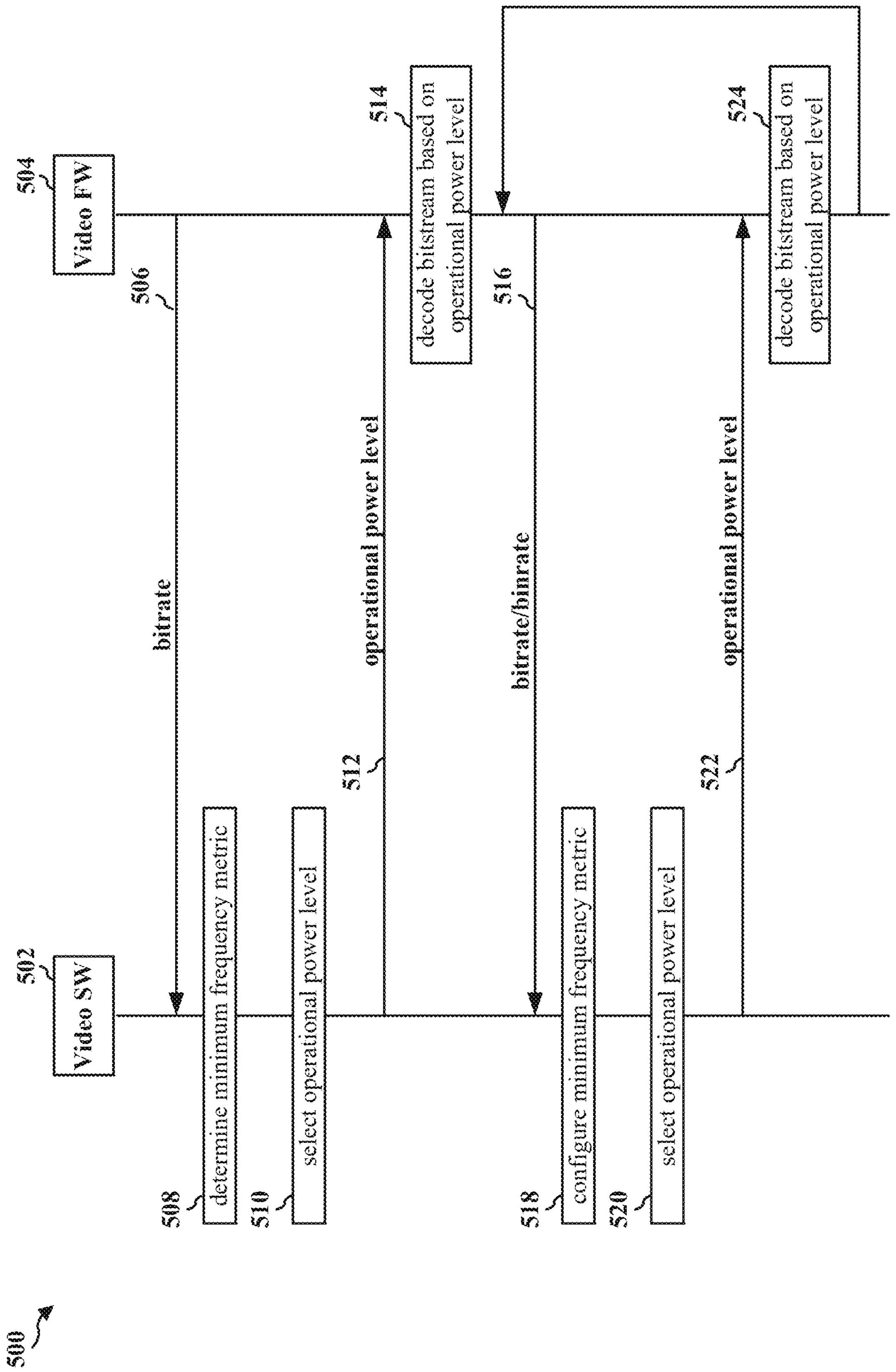
FIG. 5 is a call flow diagram illustrating example communications between video software and video firmware in accordance with one or more techniques of this disclosure.

FIG. 5 is a call flow diagram 500 illustrating example communications between video software 502 and video firmware 504. The video firmware 504 may communicate with video hardware decoding a bitstream.

The video firmware 504 may output an indicator 506 of a bitrate to the video software 502. The video software 502 may obtain the indicator 506 of the bitrate from the video firmware 504. At 508, the video software 502 may determine a minimum frequency metric, for example a number of cycles per second, for processing the bitrate. At 510, the video software 502 may select an operational power level for the video hardware based on the minimum frequency metric determined at 508. The video software 502 may output an indicator 512 of the operational power level selected at 510 to the video firmware 504. At 514, the video firmware may instruct the video hardware to decode the bitstream associated with the bitrate indicated by the indicator 506 of the bitrate using the operational power level indicated by the indicator 512 of the operational power level selected at 510.

The video firmware 504 may track the average bitrate of the video hardware. For example, when processing a video at 30 fps, the video firmware 504 may run an accumulated bit size for every 30 processed frames. The video firmware 504 may track the average binrate of the video hardware. For example, when processing a video at 30 fps, the video firmware 504 may run an accumulated bin size for every 30 processed frames. The video firmware may output an indicator 516 of the tracked bitrate and/or binrate to the video software 502. The video software 502 may obtain the indicator 516 of the tracked bitrate and/or binrate from the video firmware 504.

TABLE 2

Lookup table for configuring minimum frequency metric

| BIN comparator | Ratio |
|---|---|
| 1 | 100 |
| 2 | 106 |
| 3 | 113 |
| 4 | 119 |
| 5 | 125 |
| 6 | 131 |
| 7 | 138 |
| 8 | 144 |
| 9 | 150 |
| 10 | 152 |

At 518, the video software 502 may configure the minimum frequency metric based on the tracked bitrate and/or binrate. The video software 502 may use a lookup table (LUT) similar to the one shown in Table 2. In some aspects, if the binrate is increasing, then the video software 502 may select a BIN comparator based on the increased binrate divided by the previous binrate. For example, if the increased binrate divided by the previous binrate is 3 (i.e., the binrate has increased by three times), the video software 502 may select a ratio of 113 and may multiply the minimum frequency metric based on the bitrate by 113/100. In other aspects, if the binrate is decreasing, then the video software 502 may select a BIN comparator based on the previous binrate divided by the decreased binrate. For example, if the previous binrate divided by the decreased binrate is 3 (i.e., the binrate has decreased by three times), the video software 502 may select a ratio of 113 and may multiply the minimum frequency metric based on the bitrate by 100/113. In other words, the video software 502 may adjust a numerator of the ratio (e.g., 113 of 113/100) in response to the current binrate being greater than the previous binrate of the decoding session, adjust a denominator of the ratio (e.g., 113 of 100/113) in response to the current binrate being less than the previous binrate of the decoding session, or refrain from adjusting the ratio in response to the current binrate being equal to the previous binrate of the decoding session. In another aspect, the video software 502 may increase the ratio when the binrate increases, decrease the ratio when the binrate decreases, or may maintain the ratio when the binrate neither increases nor decreases. Refraining from adjusting a ratio may include multiplying the ratio by a multiplier that does not change the value of the ratio (e.g., multiplying by 1 or by 100%), or by not altering the value of the from a first time period to a second time period. The video software 502 may be configured to refrain from adjusting the ratio in response to an analysis of the binrate during a comparatively recent time period as compared with a previous binrate during a comparatively earlier time period.

At 520, the video software 502 may select an operational power level based on the minimum frequency metric configured at 518. The video software 502 may output an indicator 522 of the operational power level selected at 520 to the video firmware 504. The video firmware 504 may obtain the indicator 522 of the operational power level selected at 520 from the video software 502. At 524, the video firmware 504 may instruct the video hardware to decode the bitstream associated with the bitrate indicated by the indicator 522 of the bitrate and/or binrate using the operational power level indicated by the indicator 522 of the operational power level selected at 520. The video firmware 504 may continue to track the bitrate/binrate of the decoding session and report back to the video software 502 to dynamically adjust the operational power level accordingly.

Figure 6:
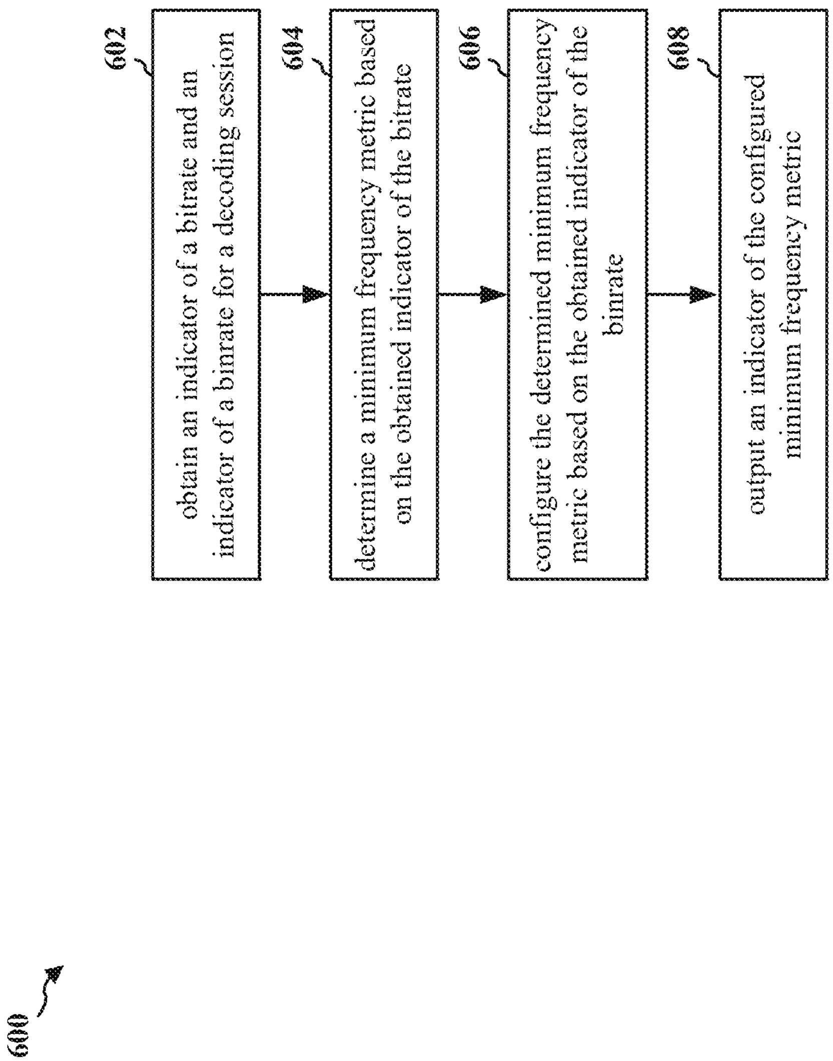
FIG. 6 is a flowchart of an example method of display processing in accordance with one or more techniques of this disclosure.

FIG. 6 is a flowchart 600 of an example method of display processing in accordance with one or more techniques of this disclosure. The method may be performed by an apparatus, such as an apparatus for display processing, a display processing unit (DPU) or other display processor, a wireless communication device, and the like, as used in connection with the aspects of FIGS. 1-5.

At 602, the apparatus may obtain an indicator of a bitrate and an indicator of a binrate for a decoding session. For example, referring to FIG. 5, the video software 502 may obtain an indicator of a bitrate and an indicator of a binrate for a decoding session.

At 604, the apparatus may determine a minimum frequency metric based on the obtained indicator of the bitrate. For example, referring to FIG. 5, the video software 502 may determine a minimum frequency metric based on the obtained indicator of the bitrate.

At 606, the apparatus may configure the determined minimum frequency metric based on the obtained indicator of the binrate. For example, referring to FIG. 5, the video software 502 may configure the determined minimum frequency metric based on the obtained indicator of the binrate.

At 608, the apparatus may output an indicator of the configured minimum frequency metric. For example, referring to FIG. 5, the video software 502 may output an indicator of the configured minimum frequency metric.

In configurations, a method or an apparatus for display processing is provided. The apparatus may be a DPU, a display processor, or some other processor that may perform display processing. In aspects, the apparatus may be the display processor 127 within the device 104 or may be some other hardware within the device 104 or another device. The apparatus may include means for obtaining an indicator of a bitrate and an indicator of a binrate for a decoding session. The apparatus may further include means for determining a minimum frequency metric based on the obtained indicator of the bitrate. The apparatus may further include means for configuring the determined minimum frequency metric based on the obtained indicator of the binrate. The apparatus may further include means for outputting an indicator of the configured minimum frequency metric.

It is understood that the specific order or hierarchy of blocks/steps in the processes, flowcharts, and/or call flow diagrams disclosed herein is an illustration of example approaches. Based upon design preferences, it is understood that the specific order or hierarchy of the blocks/steps in the processes, flowcharts, and/or call flow diagrams may be rearranged. Further, some blocks/steps may be combined and/or omitted. Other blocks/steps may also be added. The accompanying method claims present elements of the various blocks/steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, where reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for." Unless stated otherwise, the phrase "a processor" may refer to "any of one or more processors" (e.g., one processor of one or more processors, a number (greater than one) of processors in the one or more processors, or all of the one or more processors) and the phrase "a memory" may refer to "any of one or more memories" (e.g., one memory of one or more memories, a number (greater than one) of memories in the one or more memories, or all of the one or more memories). A set of processors configured to perform a set of tasks may be configured to perform the set of tasks individually, or in any combination.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media may include RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is a method of video processing, comprising: obtaining an indicator of a bitrate and an indicator of a binrate for a decoding session; determining a minimum frequency metric based on the obtained indicator of the bitrate; configuring the determined minimum frequency metric based on the obtained indicator of the binrate; and outputting an indicator of the configured minimum frequency metric.

Aspect 2 is the method of aspect 1, wherein obtaining the indicator of the binrate for the decoding session comprises: obtaining a second indicator of the binrate for the decoding session from a video hardware decoder decoding a bitstream for the decoding session.

Aspect 3 is the method of either of aspects 1 or 2, wherein obtaining the indicator of the binrate for the decoding session comprises: decoding a portion of a bitstream for the decoding session; and tracking the binrate while decoding the portion of the bitstream for the decoding session.

Aspect 4 is the method of any of aspects 1 to 3, wherein outputting the indicator of the configured minimum frequency metric comprises: selecting an operational power level based on the configured minimum frequency metric; and outputting an indicator of the selected operational power level to a video hardware decoder.

Aspect 5 is the method of aspect 4, further comprising: operating the video hardware decoder at the operational power level during the decoding session; and decoding, via the video hardware decoder, a bitstream for the decoding session.

Aspect 6 is the method of either of aspects 4 or 5, wherein outputting the indicator of the selected operational power level to the video hardware decoder comprises: outputting the indicator of the selected operational power level to a firmware of the video hardware decoder.

Aspect 7 is the method of any of aspects 4 to 6, further comprising: selecting a second operational power level based on the determined minimum frequency metric based on the obtained indicator of the bitrate before the configuration of the determined minimum frequency metric based on the obtained indicator of the binrate; and outputting a second indicator of the selected second operational power level to the video hardware decoder before outputting the indicator of the selected operational power level to the video hardware decoder.

Aspect 8 is the method of any of aspects 1 to 7, wherein configuring the determined minimum frequency metric based on the obtained indicator of the binrate comprises: adjusting the determined minimum frequency metric by a ratio based on the obtained indicator of the binrate.

Aspect 9 is the method of aspect 8, wherein configuring the determined minimum frequency metric based on the obtained indicator of the binrate comprises: adjusting a numerator of the ratio in response to the binrate being greater than a previous binrate of the decoding session; adjusting a denominator of the ratio in response to the binrate being less than the previous binrate of the decoding session; or refraining from adjusting the ratio in response to the binrate being equal to the previous binrate of the decoding session.

Aspect 10 is the method of any of aspects 1 to 9, wherein configuring the determined minimum frequency metric based on the obtained indicator of the binrate comprises: refraining from adjusting the determined minimum frequency metric by a ratio based on the obtained indicator of the binrate.

Aspect 11 is the method of any of aspects 1 to 10, wherein configuring the determined minimum frequency metric based on the obtained indicator of the binrate comprises: refraining from adjusting the determined minimum frequency metric by a ratio in response to the binrate being equal to a previous binrate of the decoding session Aspect 12 is an apparatus for display processing comprising a processor coupled to a memory and, based on information stored in the memory, the processor is configured to implement a method as in any of aspects 1-11.

Aspect 13 may be combined with aspect 12 and comprises that the apparatus is a wireless communication device.

Aspect 14 is an apparatus for display processing comprising means for implementing a method as in any of aspects 1-11.

Aspect 15 is a computer-readable medium (e.g., a non-transitory computer readable-medium) storing computer executable code, the computer executable code, when executed by a processor, causes the processor to implement a method as in any of aspects 1-11.

Various aspects have been described herein. These and other aspects are within the scope of the following claims.

What is claimed is:

1. An apparatus for display processing, comprising:

a memory; and a processor coupled to the memory and, based on information stored in the memory, the processor is configured to:

obtain an indicator of a bitrate and an indicator of a binrate for a decoding session;

determine a minimum frequency metric based on the obtained indicator of the bitrate;

configure the determined minimum frequency metric based on the obtained indicator of the binrate; and output an indicator of the configured minimum frequency metric.

2. The apparatus of claim 1, wherein, to obtain the indicator of the binrate for the decoding session, the processor is configured to:

obtain a second indicator of the binrate for the decoding session from a video hardware decoder decoding a bitstream for the decoding session.

3. The apparatus of claim 1, wherein, to obtain the indicator of the binrate for the decoding session, the processor is configured to:

decode a portion of a bitstream for the decoding session; and track the binrate while decoding the portion of the bitstream for the decoding session.

4. The apparatus of claim 1, wherein, to output the indicator of the configured minimum frequency metric, the processor is configured to:

select an operational power level based on the configured minimum frequency metric; and output an indicator of the selected operational power level to a video hardware decoder.

5. The apparatus of claim 4, wherein the processor is further configured to:

operate the video hardware decoder at the operational power level during the decoding session; and decode, via the video hardware decoder, a bitstream for the decoding session.

6. The apparatus of claim 4, wherein, to output the indicator of the selected operational power level to the video hardware decoder, the processor is configured to:

output the indicator of the selected operational power level to a firmware of the video hardware decoder.

7. The apparatus of claim 4, wherein the processor is further configured to:

select a second operational power level based on the determined minimum frequency metric based on the obtained indicator of the bitrate before the configuration of the determined minimum frequency metric based on the obtained indicator of the binrate; and output a second indicator of the selected second operational power level to the video hardware decoder before the output of the indicator of the selected operational power level to the video hardware decoder.

8. The apparatus of claim 1, wherein, to configure the determined minimum frequency metric based on the obtained indicator of the binrate, the processor is configured to:

adjust the determined minimum frequency metric by a ratio based on the obtained indicator of the binrate.

9. The apparatus of claim 8, wherein, to configure the determined minimum frequency metric based on the obtained indicator of the binrate, the processor is configured to:

adjust a numerator of the ratio in response to the binrate being greater than a previous binrate of the decoding session; and adjust a denominator of the ratio in response to the binrate being less than the previous binrate of the decoding session.

10. The apparatus of claim 1, wherein, to configure the determined minimum frequency metric based on the obtained indicator of the binrate, the processor is configured to:

refrain from adjusting the determined minimum frequency metric by a ratio based on the obtained indicator of the binrate.

11. The apparatus of claim 1, wherein, to configure the determined minimum frequency metric based on the obtained indicator of the binrate, the processor is configured to:

refrain from adjusting the determined minimum frequency metric by a ratio in response to the binrate being equal to a previous binrate of the decoding session.

12. The apparatus of claim 2, wherein the apparatus comprises a wireless communication device.

13. A method of video processing, comprising:

obtaining an indicator of a bitrate and an indicator of a binrate for a decoding session;

determining a minimum frequency metric based on the obtained indicator of the bitrate;

configuring the determined minimum frequency metric based on the obtained indicator of the binrate; and outputting an indicator of the configured minimum frequency metric.

14. The method of claim 13, wherein obtaining the indicator of the binrate for the decoding session comprises:

decoding a portion of a bitstream for the decoding session; and tracking the binrate while decoding the portion of the bitstream for the decoding session.

15. The method of claim 13, wherein outputting the indicator of the configured minimum frequency metric comprises:

selecting an operational power level based on the configured minimum frequency metric; and outputting an indicator of the selected operational power level to a video hardware decoder.

16. The method of claim 13, wherein configuring the determined minimum frequency metric based on the obtained indicator of the binrate comprises:

adjusting the determined minimum frequency metric by a ratio based on the obtained indicator of the binrate.

17. The method of claim 16, wherein configuring the determined minimum frequency metric based on the obtained indicator of the binrate comprises:

adjusting a numerator of the ratio in response to the binrate being greater than a previous binrate of the decoding session;

adjusting a denominator of the ratio in response to the binrate being less than the previous binrate of the decoding session; or refraining from adjusting the ratio in response to the binrate being equal than to the previous binrate of the decoding session.

18. The method of claim 13, wherein configuring the determined minimum frequency metric based on the obtained indicator of the binrate comprises:

refraining from adjusting the determined minimum frequency metric by a ratio based on the obtained indicator of the binrate.

19. The method of claim 13, wherein configuring the determined minimum frequency metric based on the obtained indicator of the binrate comprises:

refraining from adjusting the determined minimum frequency metric by a ratio in response to the binrate being equal to a previous binrate of the decoding session.

20. A non-transitory computer-readable medium storing computer executable code, the computer executable code, when executed by a processor, causes the processor to:

obtain an indicator of a bitrate and an indicator of a binrate for a decoding session;

determine a minimum frequency metric based on the obtained indicator of the bitrate;

configure the determined minimum frequency metric based on the obtained indicator of the binrate; and output an indicator of the configured minimum frequency metric.

* * * * *